(12) United States Patent
Kanari et al.

(10) Patent No.: US 10,323,388 B2
(45) Date of Patent: Jun. 18, 2019

(54) DISPLAY SYSTEM FOR CONSTRUCTION MACHINE

(71) Applicant: HITACHI CONSTRUCTION MACHINERY CO., LTD., Tokyo (JP)

(72) Inventors: Yasuhiko Kanari, Kasumigaura (JP); Manabu Edamura, Kasumigaura (JP); Shiho Izumi, Hitachinaka (JP); Takahiko Kurose, Moriya (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/549,300

(22) PCT Filed: Mar. 10, 2016

(86) PCT No.: PCT/JP2016/057612
§ 371 (c)(1),
(2) Date: Aug. 7, 2017

(87) PCT Pub. No.: WO2016/167061
PCT Pub. Date: Oct. 20, 2016

(65) Prior Publication Data
US 2018/0030694 A1 Feb. 1, 2018

(30) Foreign Application Priority Data

Apr. 15, 2015 (JP) ................. 2015-083664

(51) Int. Cl.
*E02F 9/26* (2006.01)
*E02F 3/32* (2006.01)
*G06T 7/246* (2017.01)

(52) U.S. Cl.
CPC .............. *E02F 9/264* (2013.01); *E02F 9/26* (2013.01); *G06T 7/248* (2017.01); *E02F 3/32* (2013.01); *G06T 2207/30241* (2013.01)

(58) Field of Classification Search
CPC .... E02F 9/264; E02F 9/26; E02F 3/32; G06T 7/248
(Continued)

(56) References Cited

U.S. PATENT DOCUMENTS

| | | | |
|---|---|---|---|
| 6,766,600 B2 * | 7/2004 | Ogura | E02F 9/2296 37/348 |
| 2003/0001751 A1 | 1/2003 | Ogura et al. | |

(Continued)

FOREIGN PATENT DOCUMENTS

| | | |
|---|---|---|
| JP | 2001123476 A | 5/2001 |
| JP | 2001132021 A | 5/2001 |

(Continued)

OTHER PUBLICATIONS

International Search Report; PCT/JP2016/057612 dated Jun. 7, 2016.

(Continued)

*Primary Examiner* — Yazan A Soofi
(74) *Attorney, Agent, or Firm* — Mattingly & Malur, PC

(57) ABSTRACT

A display system for a construction machine includes: a moving direction computing section for computing a predictive moving direction of a bucket; a work-tool display control section that, if the moving direction computing section predicts a movement of the bucket, changes the display position of a bucket image based on the predictive moving direction such that the area of a region located on the predictive moving direction side from the bucket image on the display screen of a monitor is displayed wider than when the bucket image is displayed at a reference position and that displays the bucket image at the reference position if a movement of the bucket cannot be predicted. A target-surface display control section displays on the display screen an image of a target surface when the bucket image is (Continued)

displayed at the display position determined by the work-tool display control section.

5 Claims, 15 Drawing Sheets

(58) Field of Classification Search
USPC .......................................................... 701/34.4
See application file for complete search history.

(56) References Cited

U.S. PATENT DOCUMENTS

| | | | | |
|---|---|---|---|---|
| 2007/0010925 | A1* | 1/2007 | Yokoyama | E02F 9/261 |
| | | | | 701/50 |
| 2013/0158786 | A1* | 6/2013 | Fukano | E02F 9/264 |
| | | | | 701/34.4 |
| 2014/0297040 | A1* | 10/2014 | Baba | E02F 9/2037 |
| | | | | 700/275 |
| 2016/0024757 | A1 | 1/2016 | Nomura et al. | |
| 2016/0193920 | A1 | 7/2016 | Tsubone et al. | |

FOREIGN PATENT DOCUMENTS

| | | |
|---|---|---|
| JP | 2012172429 A | 9/2012 |
| JP | 2012233404 A | 11/2012 |
| JP | 2013189760 A | 9/2013 |
| JP | 5364742 B2 | 12/2013 |
| JP | 5603520 | 8/2014 |
| JP | 2015001052 A | 1/2015 |
| JP | 201661054 A | 4/2016 |
| WO | 0240783 A1 | 5/2002 |
| WO | 2014/103498 A1 | 7/2014 |
| WO | 2014/167740 A1 | 10/2014 |

OTHER PUBLICATIONS

International Preliminary Report on Patentability received in corresponding International Application No. PCT/JP2016/057612 dated Oct. 26, 2017.
Extended European Search Report received in corresponding European Application No. 16779853.7 dated Oct. 29, 2018.

* cited by examiner

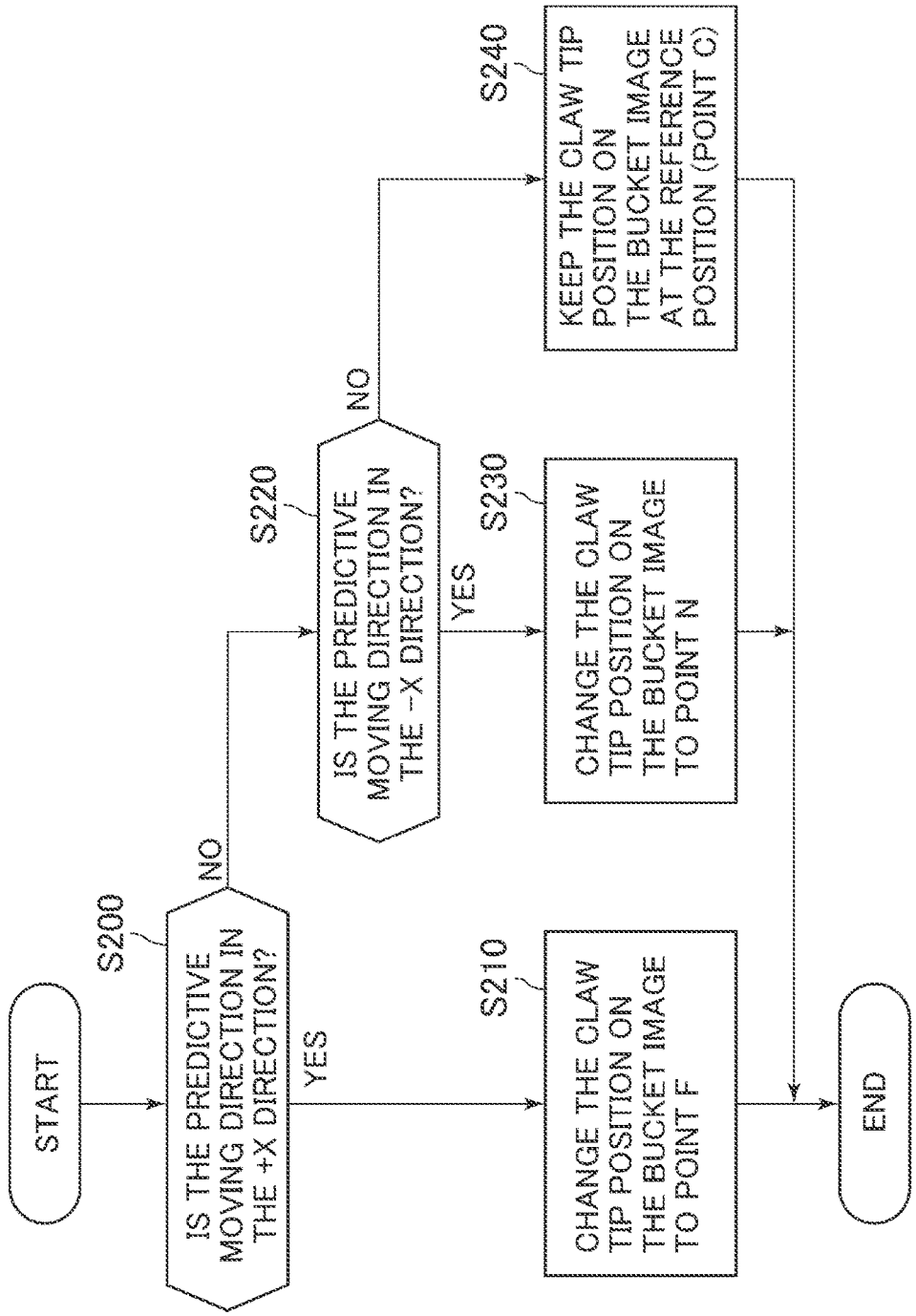

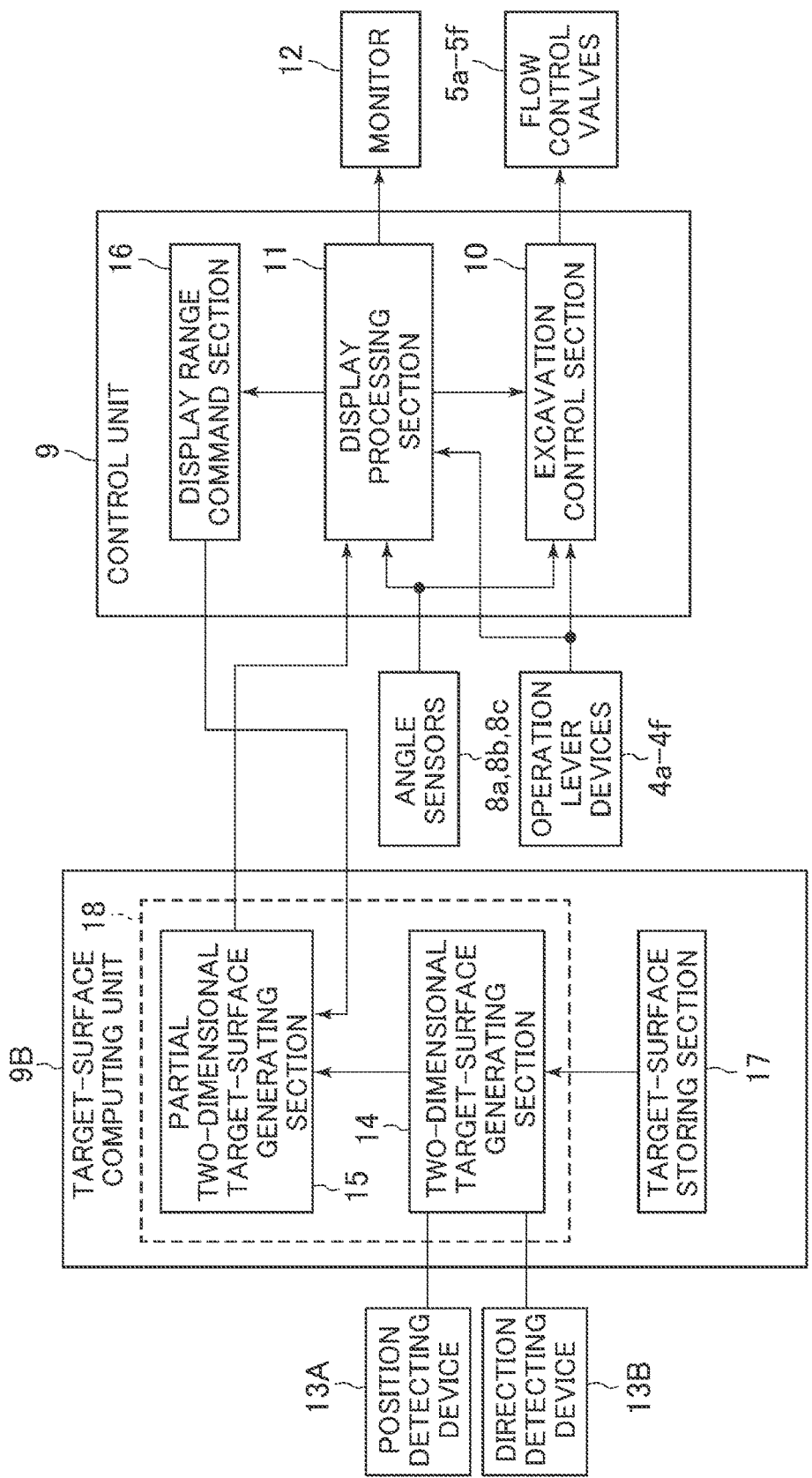

DISPLAY SYSTEM FOR CONSTRUCTION MACHINE

TECHNICAL FIELD

The present invention relates to a display system for a construction machine used in forming a predetermined target surface with a work tool provided at the tip of a work device of the construction machine.

BACKGROUND ART

A display system for a construction machine is known that, in forming a predetermined target shape with the work tool provided to the tip of the work device of the construction machine during excavation or embankment work, displays on a display screen the image of a surface forming part of a target shape (target surface) and the image of the work tool to clarify the positional relation between the two and thereby assist the excavation work.

Patent Document 1 discloses a display system that changes the scale of the display screen based on the vertical distance between the work tool (bucket) and the target surface to allow both the target surface and the work tool to be displayed on the display screen even if the vertical distance between the work tool and the target surface (target excavation surface) changes.

Patent Document 2 also discloses a display system that calculates the position of the upper boundary line indicative of the height of the upper end of the target surface in a cross section and the position of the lower boundary line indicative of the height of the lower end of the target surface in a cross section in displaying the construction machine (hydraulic excavator) and the target surface (surface to be displayed) on the display screen (guide screen). The system further determines the display range of the display screen based on the vertical positional relation between the upper or lower boundary line calculated and the position of the construction machine, thereby vertically moving the display position of the target surface on the display screen.

RELATED ART DOCUMENTS

Patent Documents

Patent Document 1: JP-2001-123476-A
Patent Document 2: JP-2012-233404-A

SUMMARY OF THE INVENTION

Problem to be Solved by the Invention

During an excavation work, the operator may want to know in advance not only the shape of a target surface near the current position of the work tool but also the shape of a target surface near the position to which the operator intends to move the work tool (for example, the shape of a target surface located outside the display screen or at the edge of the display screen). For example, during finishing work (leveling work) in which the surfaces of the target shape are flattened according to a target surface, the operator moves the work tool back and forth of the construction machine near the target surface to form a plane (target surface) rather than moving the tip of the work tool vertically to dig. Thus, if the operator knows in advance a target surface that lies ahead with respect to the current position of the work tool, the finishing work can be done more smoothly.

In the technique of Patent Document 1, because the display range is determined using the current position of the work tool as a reference, the shape of a target surface may not be displayed on the screen unless the operator actually moves the work tool toward near the position for which the operator wants to grasp the shape of the target surface.

Also, in the technique of Patent Document 2, because the display range is determined using the current vertical position of the hydraulic excavator as a reference, the shape of a target surface may not be displayed on the screen unless the operator actually moves the hydraulic excavator toward near the position for which the operator wants to grasp the shape of the target surface. Further, since a display installed in the cab of a construction machine often needs to display various types of information necessary for the control of the construction machine (for example, residual fuel, engine speed, error information, information on cameras shooting the surroundings, and work mode information), the space for displaying the hydraulic excavator and the target surface is limited. Thus, increasing the display range for displaying the hydraulic excavator and the target surface and increasing the range in which the operator can grasp the shape of the target surface will reduce the image sizes of the hydraulic excavator, the work tool, and the target surface. As a result, the operator is more likely to have difficulty in grasping the current positions of the hydraulic excavator and the work tool and the shape of the target surface.

Thus, in the technique of Patent Document 2, if the shape of the target surface located at the position to which the work tool will be moved is different from what the operator predicted, the operator needs to correct the position of the work tool only after the shape of the target surface is known. As a result, finishing work may not be done smoothly.

An object of the invention is to provide a display system for a construction machine that allows the operator to easily grasp the shape of a target surface located in the moving direction of a work tool.

Means for Solving the Problem

The present application includes several means for achieving the above object, an example of which is a display system for a construction machine, the system indicating the positional relation between a work tool provided at the tip of a work device of the construction machine and a predetermined target surface by displaying an image of the work tool and an image of the target surface on a display screen during excavation in which the work tool is used to excavate the target surface, the system including; a position/posture computing section for computing the position and posture of the work tool based on status parameters related to the position and posture of the work device; a moving direction computing section for computing a predictive moving direction of the work tool based at least on computed values of the position/posture computing section or on an operation amount of an operation device of the work device; a work-tool display control section that, if the moving direction computing section predicts a movement of the work tool, changes the display position of the image of the work tool based on the predictive moving direction such that the area of a region located on the predictive moving direction side from the image of the work tool on the display screen is displayed wider than when the image of the work tool is displayed at a reference position and that displays the image of the work tool at the reference position on the display screen if a movement of the work tool is unpredictable by the moving direction computing section; and a target-surface display control section for displaying on the display screen the image of the target surface included in the display screen when the image of the work tool is displayed at the display position determined by the work-tool display control section.

Effects of the Invention

In accordance with the invention, the operator can easily grasp the shape of a target surface located in the moving direction of the work tool because the region located in the moving direction of the work tool is displayed widely on the display screen.

BRIEF DESCRIPTION OF THE DRAWINGS

FIG. 10 is a flowchart illustrating the processing performed by a display position correcting section 111c according to the first embodiment of the invention.

FIG. 15 is a functional block diagram of a control unit and target-surface computing unit according to the first embodiment of the invention.

MODES FOR CARRYING OUT THE INVENTION

Embodiments of the present invention will now be described with reference to the accompanying drawings. In this specification, we describe an example in which a display system for a construction machine is applied to a hydraulic excavator. Note however that the embodiments that follow can be applied not only to hydraulic excavators but to any construction machine as long as it has a work device and forms a predetermined target surface with the work tool attached to the tip of the work device during excavation or embankment work.

Figure 1:
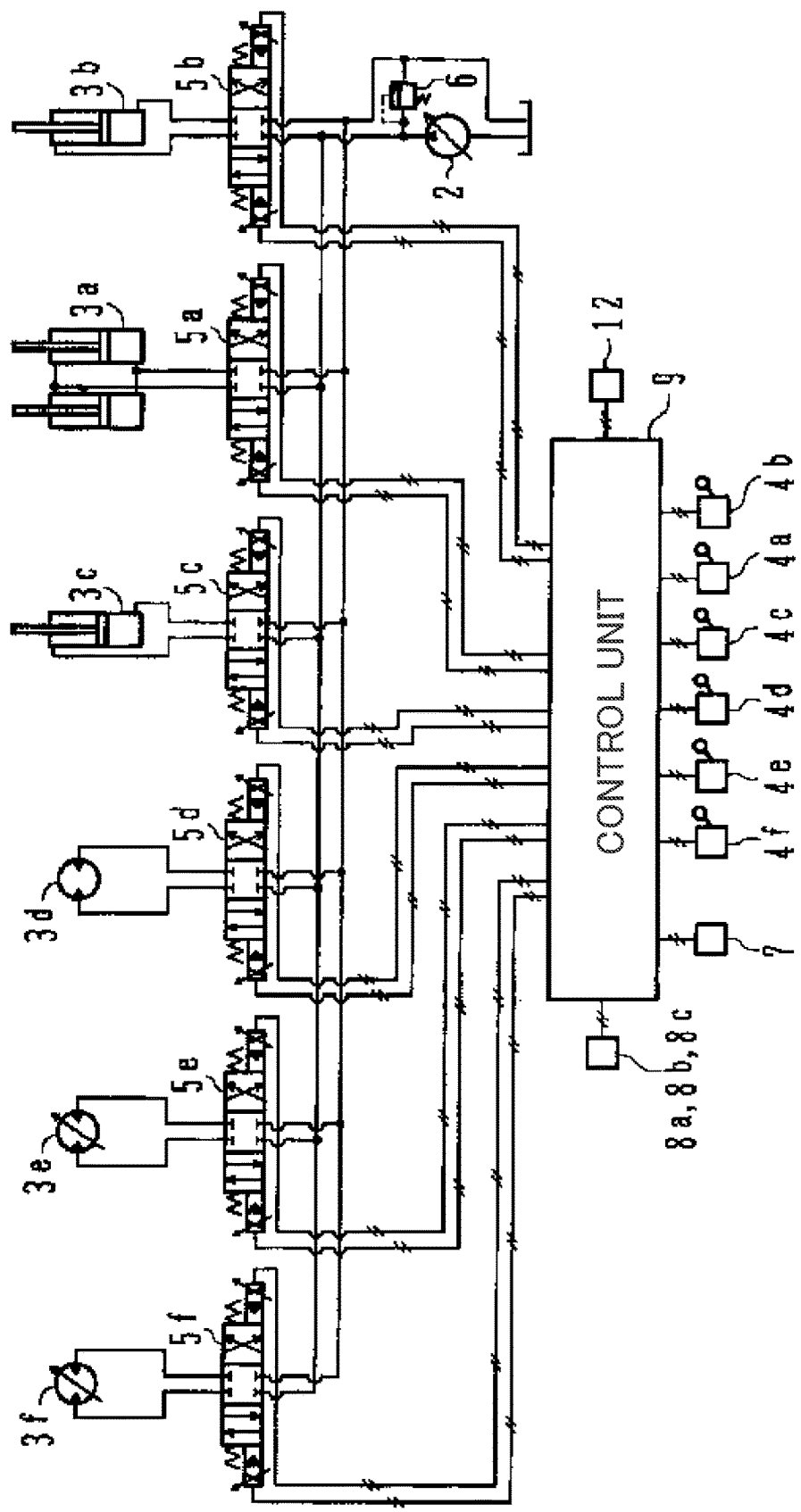
FIG. 1 is a circuit diagram of a hydraulic excavator according to a first embodiment of the invention.

The hydraulic excavator of FIG. 1 includes: a hydraulic pump 2; multiple hydraulic actuators including a boom cylinder 3a, an arm cylinder 3b, a bucket cylinder 3c, a swing motor 3d, and left and right travel motors 3e and 3f, all of which are driven by the hydraulic fluid from the hydraulic pump 2; multiple operation lever devices 4a to 4f provided for the hydraulic actuators 3a to 3f; multiple flow control valves 5a to 5f, controlled by the operation lever devices 4a to 4f, for controlling the flow rate of the hydraulic fluid supplied to the hydraulic actuators 3a to 3f; a relief valve 6 that opens when the discharge pressure of the hydraulic pump 2 becomes equal to or greater than a set value; and a control unit 9 having a function of receiving operation signals from the operation lever devices 4a to 4f to control the flow control valves 5a to 5f. These components constitute a hydraulic drive system that drives driven components of the hydraulic excavator.

In this embodiment, the operation lever devices 4a to 4f are electric lever devices that output electric signals as the operation signals, and the flow control valves 5a to 5f are each an electro-hydraulic converter that coverts an electric signal into pilot pressure, for example, an electric/hydraulic operated valve with proportional solenoid valves provided at its both ends. The control unit 9 receives operation signals from the operation lever devices 4a to 4f and generates flow control valve drive signals based on the input signals to drive and control the flow control valves 5a to 5f.

Figure 2:
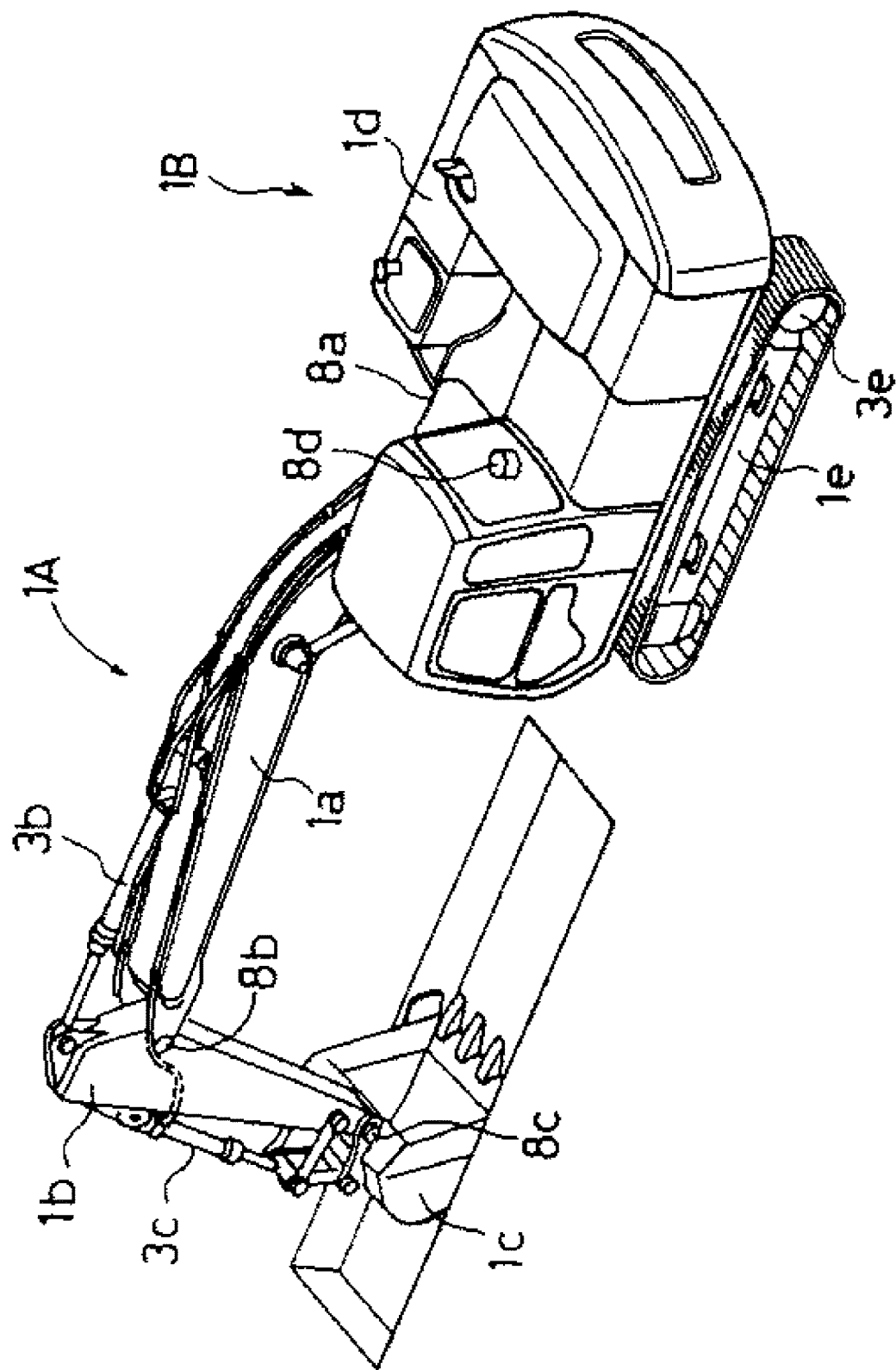
FIG. 2 is an external view of the hydraulic excavator of the first embodiment of the invention.

As illustrated in FIG. 2, the hydraulic excavator includes a machine body 1B including an upper swing structure 1d and a lower travel structure 1e and a multi-joint type work device 1A attached to the front of the upper swing structure 1d, the work device 1A including a boom 1a, an arm 1b, and a bucket 1c that pivot vertically. The proximal end of the boom 1a of the work device 1A is supported at the front of the upper swing structure 1d.

The boom 1a, the arm 1b, the bucket 1c, the upper swing structure 1d, and the lower travel structure 1e of FIG. 2 are respectively driven by the boom cylinder 3a, the arm cylinder 3b, the bucket cylinder 3c, the swing motor 3d, and the left and right travel motors 3e and 3f of FIG. 1. The operation of these components is controlled with the operation lever devices 4a to 4f.

The above-described hydraulic excavator includes an excavation control device and work status display device according to the present embodiment. These devices include a setting device 7 used for setting a target surface; angle sensors 8a, 8b, and 8c, provided at the fulcrums of the boom 1a, the arm 1b, and the bucket 1c, for detecting rotational angles as status parameters indicative of the position and posture of the work device 1A; a display monitor (display device) 12 installed in the cab; and the control unit 9 that is a computer executing the processing functions described later (for example, a microcomputer).

Figure 3:
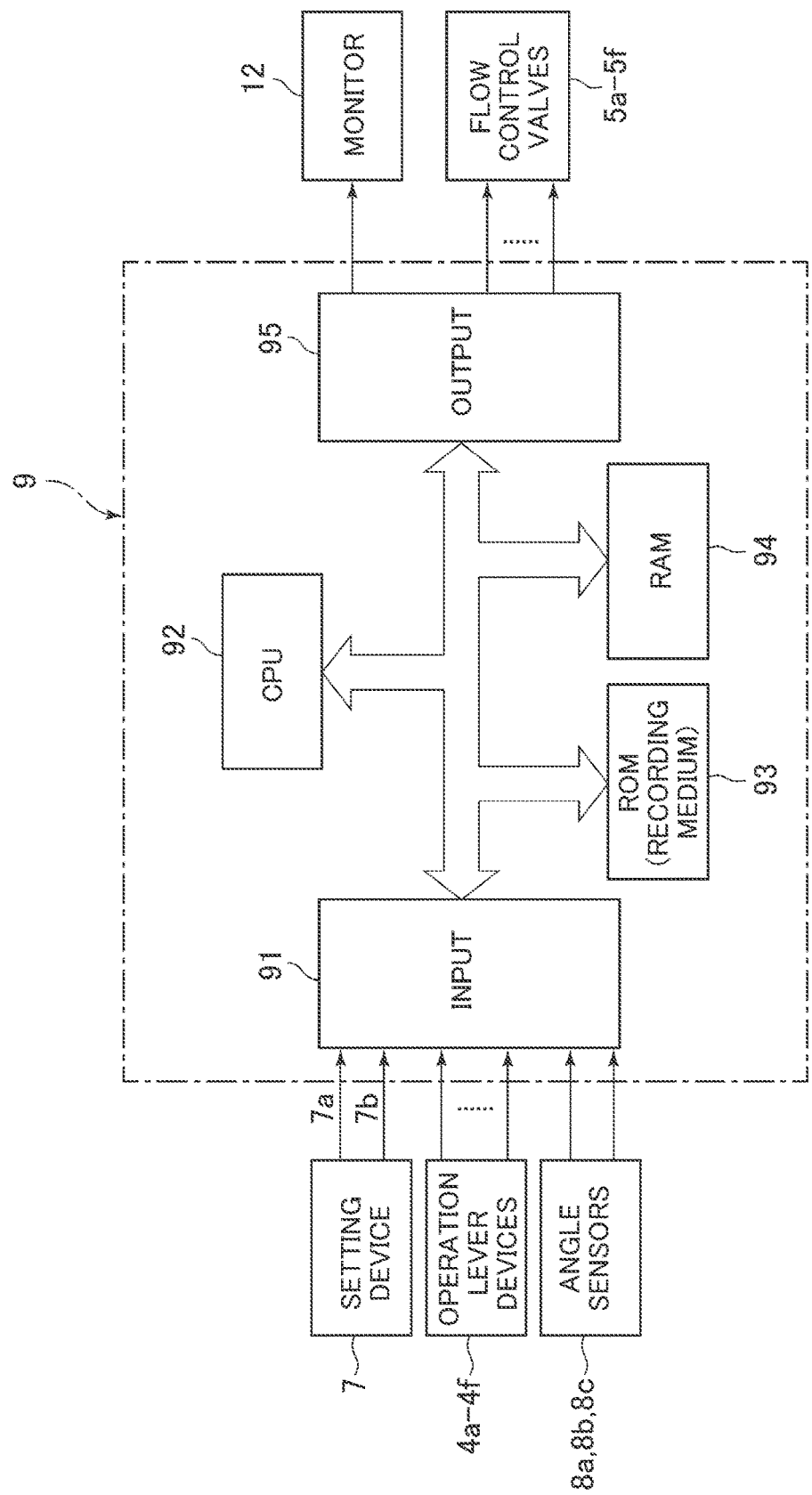
FIG. 3 illustrates the hardware configuration of a control unit according to the first embodiment of the invention.

FIG. 3 illustrates the hardware configuration of the control unit 9. The control unit 9 includes an input unit 91; a central processing unit (CPU) 92 or a processor; a read-only memory (ROM) 93 and a random access memory (RAM) 94, or storage devices; and an output unit 95. The input unit 91 receives operation signals from the operation lever devices 4a to 4f; command signals (setting signals and main switch signals) from the setting device 7, and angle signals from the angle sensors 8a, 8b, and 8c and performs analog to digital conversion. The ROM 93 is a recoding medium on which control programs (described later) are stored, and the CPU 92 performs predetermined computational processing on signals output from the input unit 91 and the memories 93 and 94 based on the control programs stored on the ROM 93. The output unit 95 generates output signals based on the computation results obtained at the CPU 92 and transmits these signals to the flow control valves 5a to 5f and the monitor 12 to drive and control the hydraulic actuators 3a to 3f or to cause the monitor 12 to display images of the machine body 1B, the bucket 1c, a target surface, and the like. Note that although the control unit 9 of FIG. 3 includes as storage devices semiconductor memories such as the ROM 93 and the RAM 94, it can instead include a magnetic storage devices such as hard disk drives or the like, and the control programs can be stored on such devices.

The setting device 7 consists of, for example, multiple switches or similar operation device provided on the grips of the operation lever devices 4a to 4f. In the present embodiment, the setting device 7 includes a switch 7a used for setting a target surface and a switch 7b used for disabling the set target surface. When the switch 7a is pressed, the current position of the claw tip of the bucket 1c is stored on the control unit 9. When the switch 7a is pressed repeatedly, more than two positions are stored on the control unit 9, thereby setting a target surface defined by the positions. On the other hand, when the switch 7b is pressed, the target surface set with the switch 7a is disabled.

In the present embodiment, all points defined with the switch 7a are set as X-Z coordinates, described later (see FIG. 6), and a surface that includes the straight line (line segment) defined between two points in an X-Z plane and is perpendicular to the X-Z plane is used as a target surface. This way, a target surface can be set using two points.

A target surface set with the switch 7a may be displayed on the monitor 12 as a schematic diagram or values so that the operator can view the set target surface.

Figure 4:
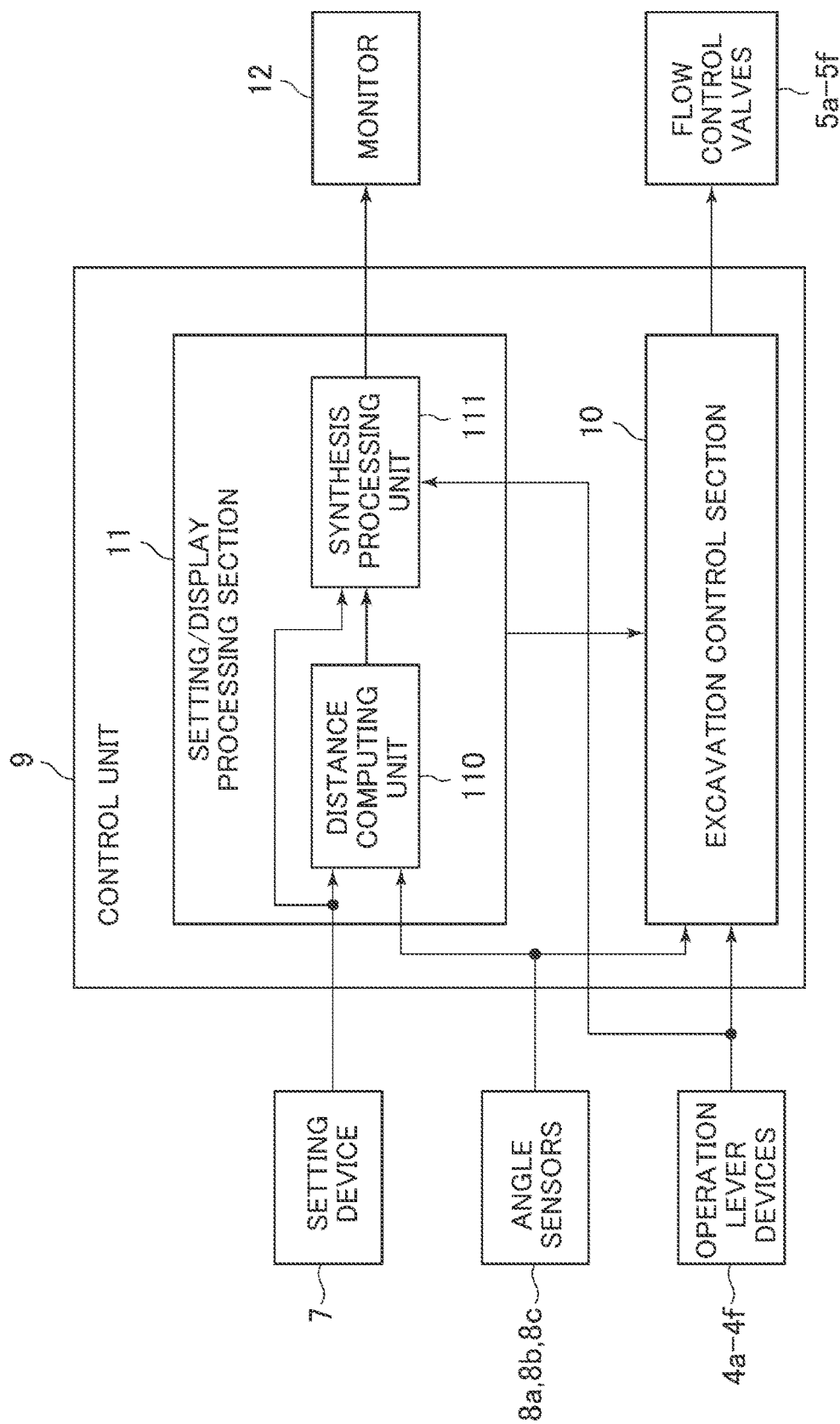
FIG. 4 is a functional block diagram of the control unit of the first embodiment of the invention.

FIG. 4 is a functional block diagram illustrating an overview of the control programs stored on the ROM 93 of the control unit 9. The control unit 9 includes an excavation control section 10 that performs excavation control and a setting/display processing section 11 that performs setting processing on a target surface and display processing on the monitor 12. The excavation control section 10 performs processing in which command signals for the flow control valves 5a to 5f are generated based on operation signals from the operation lever devices 4a to 4f.

The setting/display processing section 11 computes and sets a target surface for the coordinate system of the hydraulic excavator (see FIG. 6) based on an output signal from the setting device 7 and displays a schematic diagram (image) of the target surface on the monitor 12. The setting/display processing section 11 also computes the position and posture of the bucket 1c based on detection signals from the angle sensors 8a, 8b, and 8c and displays on the monitor 12 a schematic diagram (image) indicative of the computed position and posture of the bucket 1c as viewed from a side surface of the hydraulic excavator. This way, the schematic diagram of the bucket 1c viewed from the side surface of the hydraulic excavator and the schematic diagram of the target surface are displayed on the monitor 12 in a synthesized manner.

The setting/display processing section 11 includes a distance computing unit 110 and a synthesis processing unit 111. The distance computing unit 110 receives signals from the detection signals from the angle sensors 8a, 8b, and 8c and computes the posture of the bucket 1c, thereby computing the vertical distance between the claw tip of the bucket 1c and the target surface based on the positional relation between the posture and the set target surface. The synthesis processing unit 111 computes the relative positional relation between the bucket 1c and the target surface based on the vertical distance between the posture of the bucket 1c and the target surface and on the position and gradient of the target surface, performs synthesis processing on the schematic diagram of the bucket 1c as viewed from a side surface of the hydraulic excavator and the schematic diagram of the target surface, and displays a synthesized schematic diagram on the display monitor 12 installed in the cab.

Figure 5:
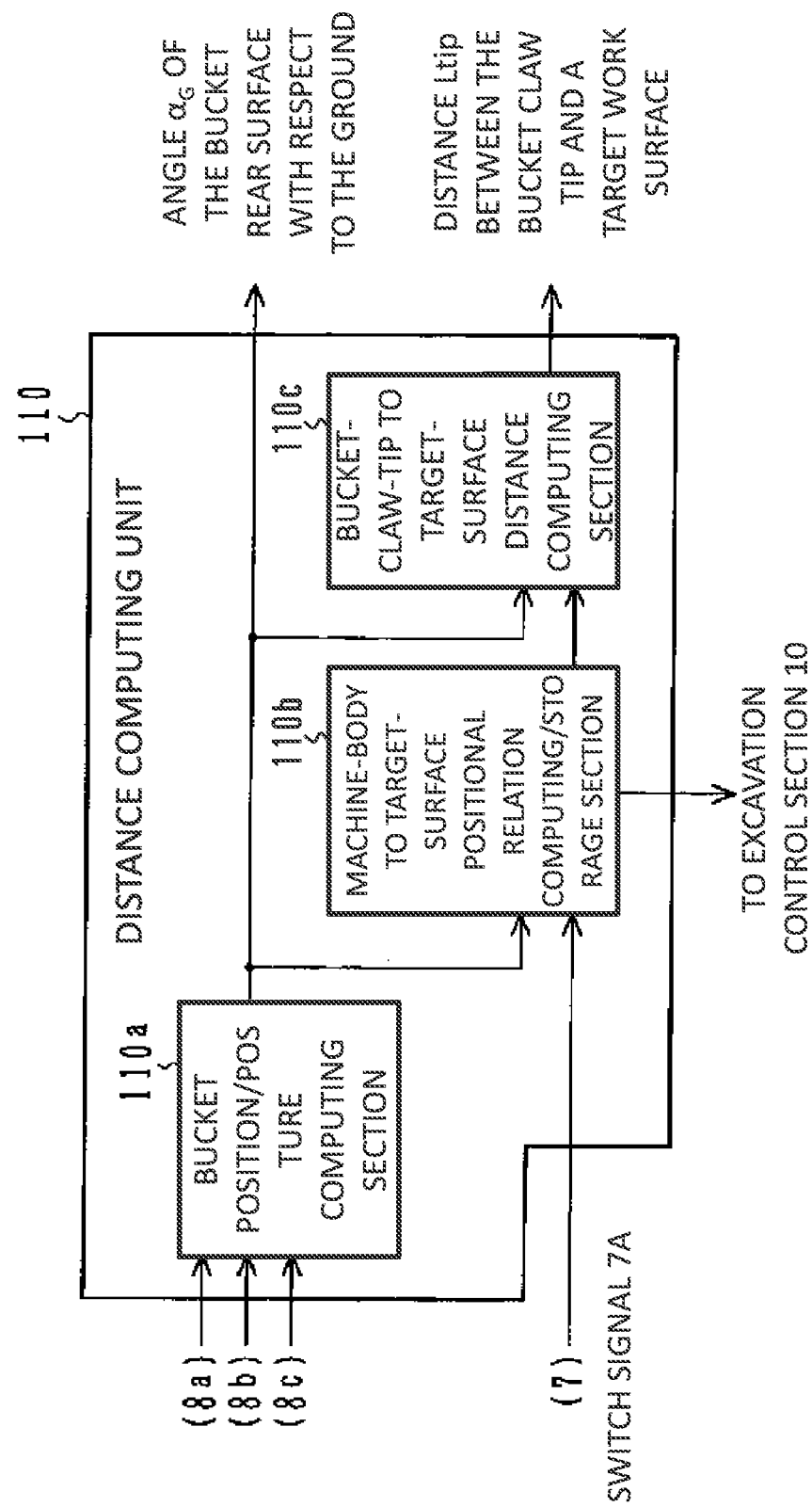
FIG. 5 is a functional block diagram of a distance computing unit 110 according to the first embodiment of the invention.

We now describe the processing functions of the distance computing unit 110 with reference to FIG. 5. FIG. 5 is a block diagram illustrating the processing functions of the distance computing unit 110, and the distance computing unit 110 includes a bucket 1c position/posture computing section 110a, a machine-body 1B to target-surface positional relation computing/storage section 110b, and a bucket-claw-tip to target-surface distance computing section 110c.

Figure 6:
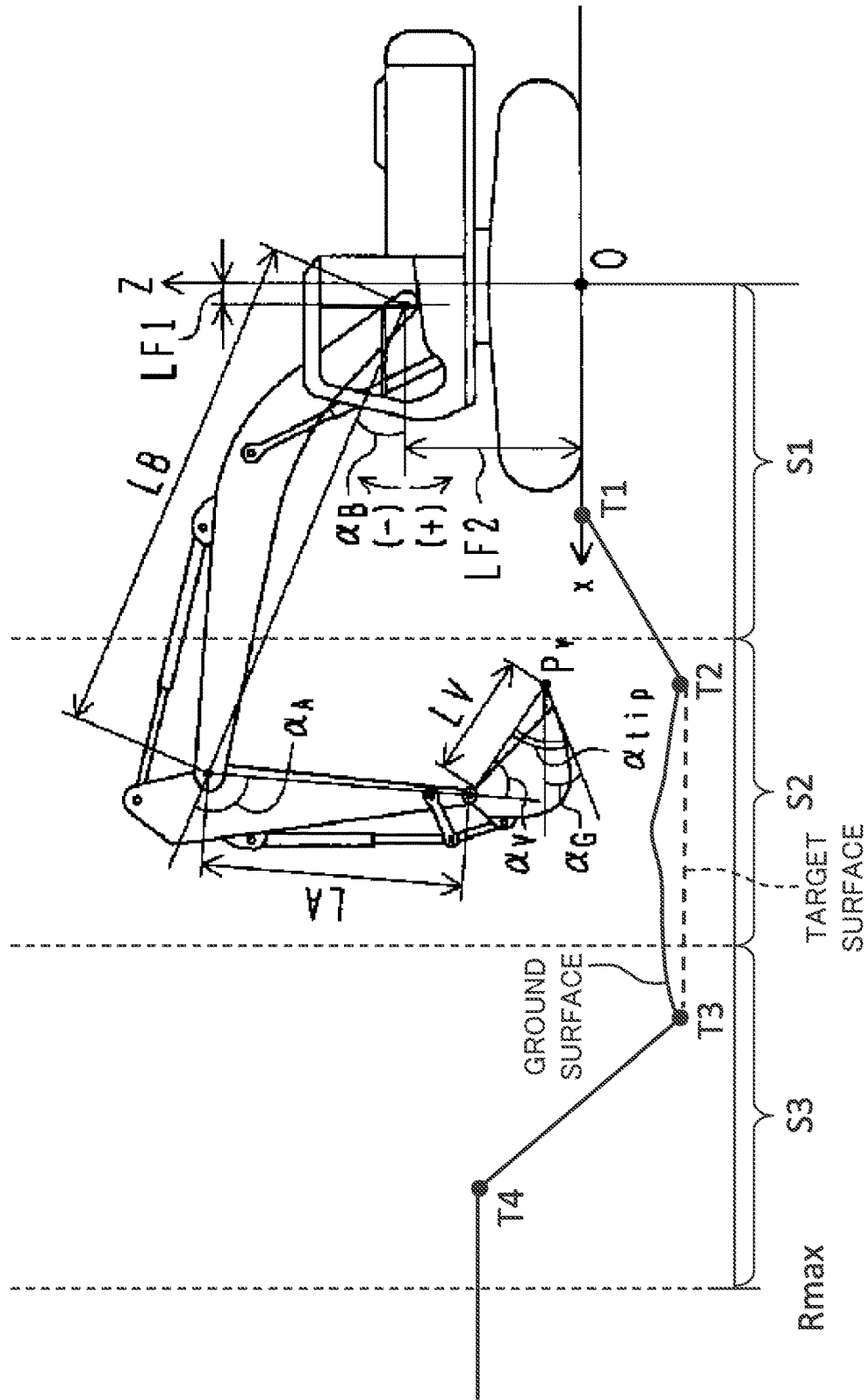
FIG. 6 illustrates the coordinate system (X-Z coordinate system) of the hydraulic excavator of the first embodiment of the invention and the dimensions of each component.

The bucket position/posture computing section 110a computes the X-Z coordinates (Pvx, Pvz) of the claw tip of the bucket based on the coordinate system of the hydraulic excavator of FIG. 6, the dimensions of each part, and the following formulae (1) and (2). LV is the distance from the bucket claw tip to the bucket pivot center, LA being the distance from the bucket pivot center to the arm pivot center, LB being the distance from the arm pivot center to the boom pivot center. The coordinates of the boom pivot center is presented by (LF1, LF2).

$$Pvx = LV \times \cos(\alpha B + \alpha A + \alpha V) + LA \times \cos(\alpha B + \alpha A) + LB \times \cos \alpha B + LF1 \quad (1)$$

$$Pvz = -LV \times \sin(\alpha B + \alpha A + \alpha V) - LA \times \sin(\alpha B + \alpha A) - LB \times \sin \alpha B + LF2 \quad (2)$$

The bucket position/posture computing section 110a also computes the angle $\alpha G$ of the bucket rear surface with respect to the ground based on the following formula (3).

$$\alpha G = -\alpha B - \alpha A - \alpha V - \alpha \text{tip} + 180° \quad (3)$$

The machine-body to target-surface positional relation computing/storage section 110b stores the bucket claw tip coordinates (Pvx, Pvz) computed by the bucket position/posture computing section 110a when a signal from the switch 7a of the setting device 7 is input. The machine-body to target-surface positional relation computing/storage section 110b stores bucket claw tip coordinates every time the switch 7a is pressed and a signal is input. When the switch 7a is pressed twice or more (when two points or more are set), the machine-body to target-surface positional relation computing/storage section 110b computes the linear equation defining a target surface by the two points or more and stores the linear equation as the one indicative of the position of the target surface. As a method for setting a target surface when three points or more are set, there are, for example, a method in which a target surface is defined by a polyline in an X-Z plane depicted by connecting points in the order of being set, a method in which a target surface is defined by only the closer two points of the three or more, and the like, but other setting methods can also be employed. When a target surface is defined by a polyline, there are multiple linear equations that define the target surface (specifically, there are as many linear equations as the line segments that constitute the polyline).

In the example of FIG. 6, as the points stored on the positional relation computing/storage section 110b as the coordinates of the bucket claw tip, there are four points: T1, T2, T3, and T4. A target surface in the form of a polyline is defined by, among the four points, two points placed next to each other in an X direction.

The bucket-claw-tip to target-surface distance computing section 110c computes the vertical distance Ltip between the bucket claw tip and the target surface using the current bucket claw tip coordinates (Pvx, Pvz) computed at the bucket position/posture computing section 110a and the linear equation of the target surface computed at the machine-body to target-surface positional relation computing/storage section 110b. Specifically, the distance between the bucket claw tip coordinates (Pvx, Pvz) and the straight line defined by the linear equation of the target surface is computed as the vertical distance Ltip. If there are multiple linear equations (straight lines) that indicate the target surface, the vertical distance Ltip from the current position of the bucket claw tip to the closest straight line in a Z direction (that is, the closest straight line of the straight lines existing right above or right below the bucket claw tip) is computed.

Figure 7:
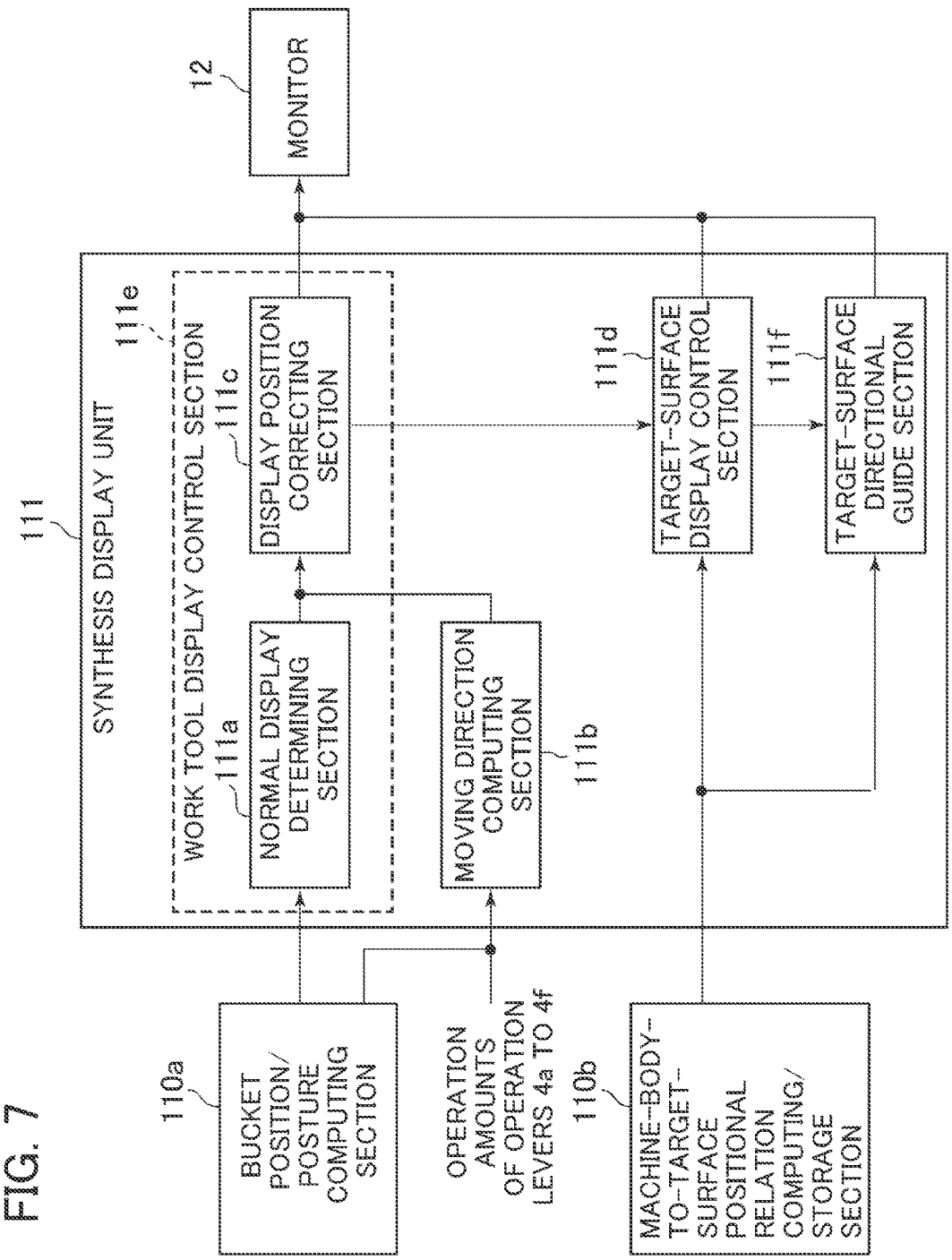
FIG. 7 is a functional block diagram of an image synthesizing unit 111 according to the first embodiment of the invention.

We now describe the processing functions of the synthesis processing unit 111 with reference to FIG. 7. FIG. 7 represents the processing functions of the synthesis processing unit 111 in a block diagram, and the synthesis processing unit 111 includes a work-tool display control section 111e, a moving direction computing section 111b, and a target-surface display control section 111d.

Figure 9:
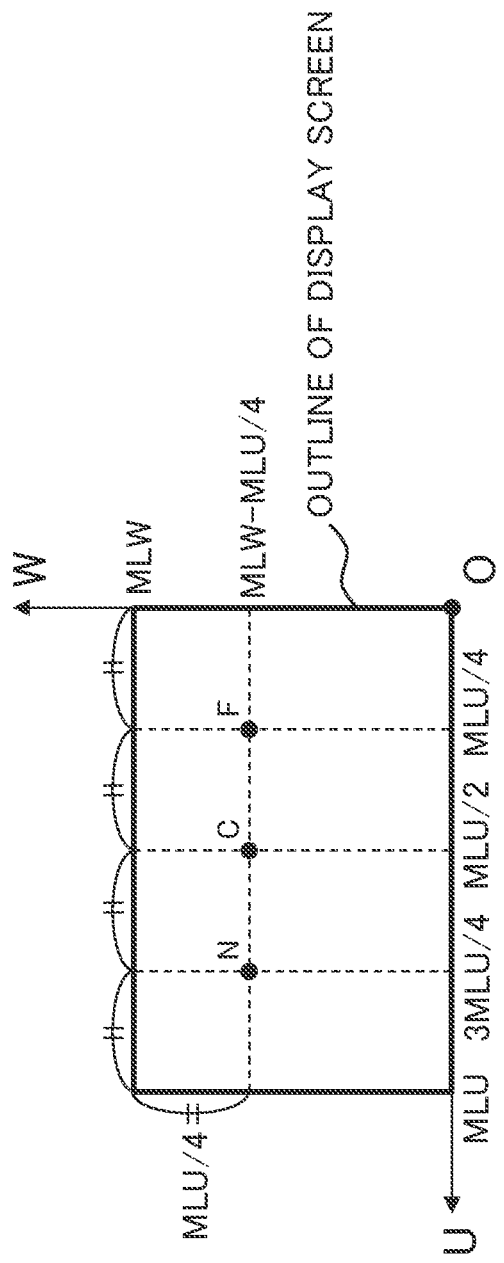
FIG. 9 illustrates the coordinate system (U-W coordinate system) of the display screen of a monitor according to the first embodiment of the invention and the claw tip position of a bucket image.

When the moving direction computing section 111b predicts a movement of the bucket 1c, the work-tool display control section 111e performs processing to change the display position of an image of the bucket 1c based on a predictive moving direction such that the area of a region located ahead on the predictive moving direction side from the image of the bucket 1c on the display screen of the monitor 12 becomes larger than when the image of the bucket 1c is displayed at a reference position (the reference position is the position that serves as a reference when the image of the bucket 1c is displayed on the display screen, and point C of FIG. 9 is an example). In cases other than the above (for example, when the identification of the predictive moving direction of the bucket 1c by the moving direction computing section 111b is impossible, or when display position changing processing associated with the predictive moving direction is not performed on the image of the bucket 1c), the work-tool display control section 111e displays the image of the bucket 1c at the reference position on the display screen of the monitor 12. To perform this processing, the work-tool display control section 111e includes a normal display determining section 111a and a display position correction controlling section 111c.

The normal display determining section 111a determines the posture of the bucket 1c when an image of the bucket 1c is displayed at the position that serves as a reference (reference position) when the image of the bucket 1c is displayed on the display screen of the monitor 12, based on the computed values of the bucket position/posture computing section 110a The normal display determining section 111a is the part that determines, based on the computed values of the bucket position/posture computing section 110a, the posture of the bucket 1c when the image of the bucket 1c is displayed at the reference position preset on the display screen of the monitor 12. "Reference position" is the position that serves as a reference when the claw tip on the image of the bucket 1c is displayed on the display screen, and it is a point set as the coordinates of the U-W coordinate system set on the display screen of the monitor 12 (point C of FIG. 9). FIG. 9 illustrates an example of the U-W coordinate system set on the display screen of the monitor 12, and the right bottom corner of the display screen is set as point O. The rectangle illustrated by the bold lines of FIG. 9 represents the outline of the display screen, the display screen dimension in the W direction being MLW, the display screen dimension in the U direction being MLU. Point C of FIG. 9 (MLU/2, MLW-MLU/4) is the reference position.

The moving direction computing section 111b is the part that performs computational processing to compute a predictive moving direction of the bucket 1c in the U-W plane of the display screen based at least on the computed values of the position/posture computing section 110a or the operation amounts (operation signals) of the three operation levers 4a to 4c that control the work device 1A.

Figure 8:
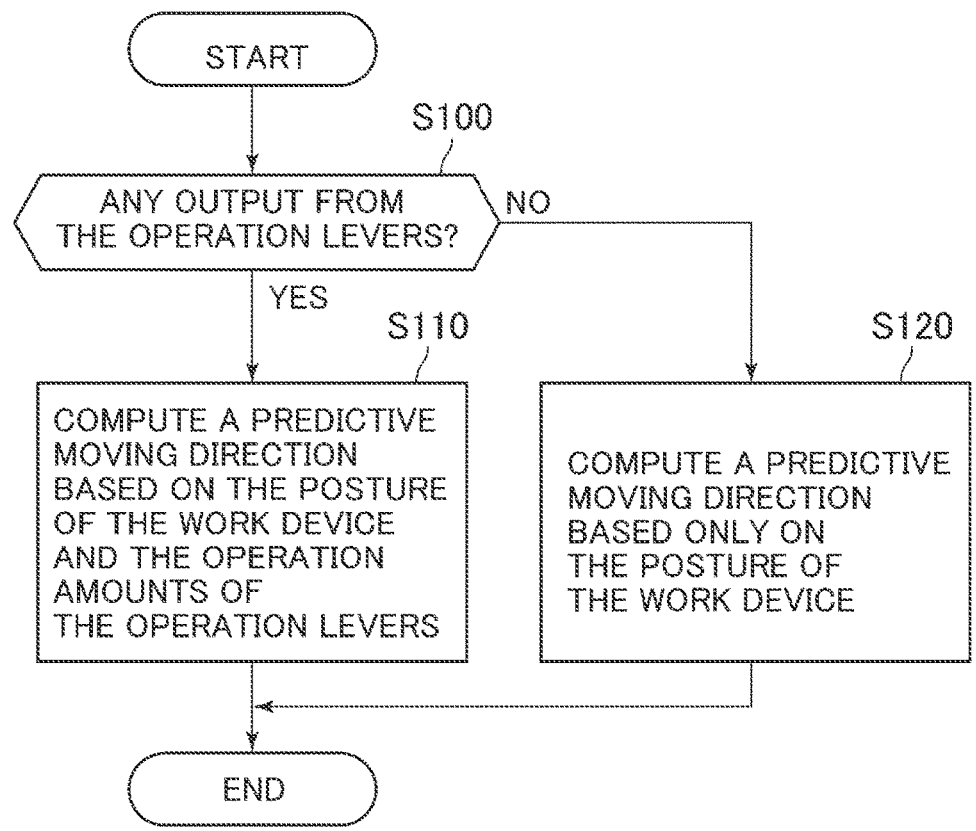
FIG. 8 is a flowchart illustrating the processing performed by a moving direction computing section 111b according to the first embodiment of the invention.

We now describe the processing performed by the moving direction computing section 111b with reference to the flowchart of FIG. 8. After the flowchart of FIG. 8 starts, the process proceeds to S100 in which it is determined whether the moving direction computing section 111b has received operation signals form any of the three operation levers 4a to 4c.

When it is determined in S100 that operation signals have been input (that is, the work device 1A is being operated), the process proceeds to S110 in which a predictive moving direction of the bucket 1c is computed based on the operation signals input by the operation levers 4a to 4c and the posture of the work device 1A at that time, which is obtained from the computed values of the position/posture computing section 110a. More specifically, the moving direction computing section 111b first computes the angles $\alpha_B$, $\alpha_A$, and $\alpha_V$ of the boom 1a, the arm 1b, and the bucket 1c, respectively, at that time, which are obtained from the computed values of the position/posture computing section 110a. The storage devices in the control unit 9 stores the operating speeds of the hydraulic cylinders 3a to 3c associated with the operation amounts of the operation levers 4a to 4c, and the moving direction computing section 111b computes the rotational angles of the boom 1a, the arm 1b, and the bucket 1c that they will have after a predetermined control cycle based on the angles $\alpha_B$, $\alpha_A$, and $\alpha_V$ and on the operating speeds derived from the operation amounts of the operation levers 4a to 4c, thereby computing the predictive moving direction of the bucket claw tip.

The predictive moving direction obtained in S110 is represented by a vector in the X-Z plane, but in the present embodiment, for the purpose of simplifying explanation and processing, only the X component of the vector is regarded as the predictive moving direction. That is, the predictive moving direction is either in the left direction (+X direction) or right direction (−X direction) of FIG. 6. If the predictive moving direction cannot be identified by the computation in S110 (for example, if the X component is not present (upper direction or lower direction), or if it is not clear which direction, right or left, the bucket will move in), the movement of the bucket is regarded as "unpredictable."

If, on the other hand, it is determined in S100 that operation signals have not been input (that is, when the work device 1A is being stationary), the process proceeds to S120 in which a predictive moving direction of the bucket 1c is computed based only on the posture of the work device 1A at that time, which is obtained from the computed values of the position/posture computing section 110a.

As an example of the method of computing the predictive moving direction based only on the posture of the work device 1A in S120, the present embodiment adopts the following method. First, as illustrated in FIG. 6, the maximum horizontal distance the claw tip of the bucket 1c can reach when the boom 1a, the arm 1b, and the bucket 1c are operated is set as Rmax, and three closed regions are set in order from the swing center of the upper swing structure 1d to Rmax (first region S1, second region S2, and third region S3). (1) If it is determined based on the posture of the work device 1A that the bucket claw tip is in the third region S3, it will be determined that the bucket 1c will move toward the second region S2 direction, and the direction in which the bucket 1c moves closer to the upper swing structure 1d (−X direction of FIG. 6) is regarded as the predictive moving direction. (2) If it is determined that the bucket claw tip is in the first region S1, it will be determined that the bucket 1c will move toward the second region S2, and the direction in which the bucket moves away from the upper swing structure 1d (+X direction of FIG. 6) is regarded as the predictive moving direction of the bucket 1c. (3) If it is determined that the bucket claw tip is in the second region S2, it will be determined that the predictive moving direction is unidentifiable (unpredictable) since the bucket can move closer to or away from the upper swing structure 1d.

After the processing of S110 or S120 is completed, the moving direction computing section 111b outputs the computed predictive moving direction to the display position correcting section 111c and is put on standby until the next control cycle.

The normal display determining section 111a is the part that determines the mode of display (normal display) when an image of the bucket 1c is displayed at the reference position on the display screen of the monitor 12. The normal display determining section 111a of the present embodiment determines the "posture" of the image when the image of the bucket 1c is displayed at the reference position based on the computed values of the bucket position/posture computing section 110a. Specifically, the angle $\alpha_G$ of the bucket rear surface with respect to the ground computed by the bucket position/posture computing section 110a is used, and an image of a bucket side view in which the bucket rear surface is tilted by that angle $\alpha_G$ (orthographic projection including one side surface) is displayed as the bucket image. The bucket side-view image can be not only a side-view diagram, picture, or the like of the bucket 1c displayed to proper scale but also one simplified as long as the bucket claw tip is recognizable. The scale of the bucket side-view image is fixed to a predetermined value. When the scale is fixed, the operator can grasp more easily how much the bucket claw tip is distanced from the target surface than when the scale is not fixed.

With the above processing, the normal display by the normal display determining section 111a is such that a bucket image (bucket side-view image) of a predetermined scale in which the bucket rear surface is tilted by the angle $\alpha_G$ is displayed with the bucket claw tip on the image being located at the reference position C.

The display position correcting section 111c is the part that performs processing to change the display position of the bucket image on the display screen from the reference position (point C) based on the predictive moving direction computed by the moving direction computing section 111b. The posture of the bucket image determined by the normal display determining section 111a are kept even after the change processing of the display position by the display position correcting section 111c. The display position (reference position C) and the posture of the bucket image determined by the normal display determining section 111a and the predictive moving direction computed by the moving direction computing section 111b are input to the display position correcting section 111c.

We now describe the processing performed by the display position correcting section 111c with reference to the flowchart of FIG. 10. When the flowchart of FIG. 10 starts, it is first determined whether the predictive moving direction computed by the moving direction computing section 111b is in the +X direction or not (S200). If it is in the +X direction (the direction in which the bucket moves away from the upper swing structure 1d), the claw tip position on the bucket image is changed from the reference position C to point F (see FIG. 9), and the bucket image is displayed such that the bucket claw tip is located at point F (S210). The coordinates of point F are (MLU/4, MLW-MLU/4). Point F is set at a position closer to the upper swing structure 1d than point C; thus, the area of the region located on the predictive moving direction (+X direction (+U direction) side) from the bucket image on the display screen when the bucket image is displayed at point F is larger than when the bucket image is displayed at point C (MLU/2, MLW-MLU/4). The display position correcting section 111c outputs information to the target-surface display control section 111d to the effect that the bucket claw tip is displayed at point F.

If it is determined in S200 that the predictive moving direction is not in the +X direction, it is then determined whether the predictive moving direction is in the −X direction (the direction closer to the upper swing structure 1d) (S220). If it is determined in S220 that it is in the −X direction, the display position correcting section 111c changes the bucket claw tip position on the bucket image from the reference position C to point N (see FIG. 9) and displays the bucket image such that the bucket claw tip is located at point N (S230). The coordinates of point N are (3MLU/4, MLW-MLU/4). Point N is set at a position located farther away from the upper swing structure 1d than point C; thus, the area of the region located on the predictive moving direction (−X direction (−U direction) side) from the bucket image on the display screen when the bucket image is displayed at point N is larger than when the bucket image is displayed at point C (MLU/2, MLW-MLU/4). The display position correcting section 111c outputs information to the target-surface display control section 111d to the effect that the bucket claw tip is displayed at point N.

If it is determined in S220 that the predictive moving direction is not in the −X direction (for example, if the predictive moving direction is unidentifiable (unpredictable)), the display position correcting section 111c does not change the claw tip position on the bucket image from the reference position C and displays the bucket image such that the bucket claw tip is located at point C (S240). The display position correcting section 111c outputs information to the target-surface display control section 111d to the effect that the bucket claw tip is displayed at point C.

In displaying the bucket image on the display screen in S210, S230, or S240, the coordinates of point C, F, or N, a predetermined scale factor, and information on the angle $\alpha_G$ are used to draw the bucket image. The predetermined scale factor is a preset value or range that allows the entire bucket image to be displayed on the display screen, for example, a value less than 1.

The W coordinates (Mvw) of all points C, F, and N in the example of FIG. 9 are (MLW-MLU/4), and the U coordinate (Mvu) of each point is set to a point that equally divides the width (MLU) of the display screen into four parts. However, this is only meant to be an example. As long as points F, C, and N are arranged along the +U direction from point O in the stated order, the U coordinates of the three points need not be the above value, and the W coordinates of the three points need not be the same as above.

Referring back to FIG. 7, the target-surface display control section 111d is the part that executes processing to display on the display screen an image of the outline of the target surface that is included in the display screen when the bucket image is displayed at the display position (point C, F, or N) determined by the work-tool display control section 111e (the normal display determining section 111a and the display position correction control section 111c).

In displaying the target surface on the display screen, the scale of a U-W plane with respect to an X-Y plane (scale of the display screen), the coordinates indicative of the position of the bucket claw tip in the X-Y plane and the U-W plane, the positional information of the target surface in the X-Y plane, and the vertical distance Ltip between the bucket claw tip and the target surface in the X-Y plane are utilized.

Figure 11A:
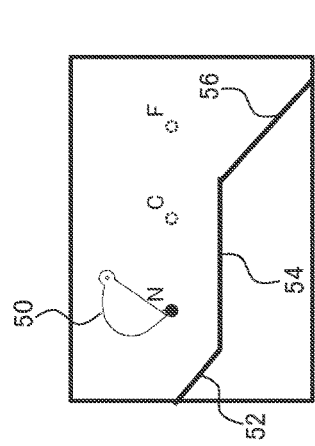
FIG. 11A illustrates an example of the display screen of the display system for a construction machine of the first embodiment of the invention.
Figure 11B:
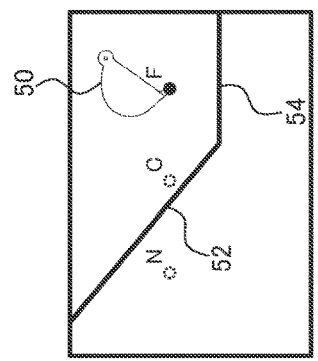
FIG. 11B illustrates an example of the display screen of the display system for a construction machine of the first embodiment of the invention.
Figure 11C:
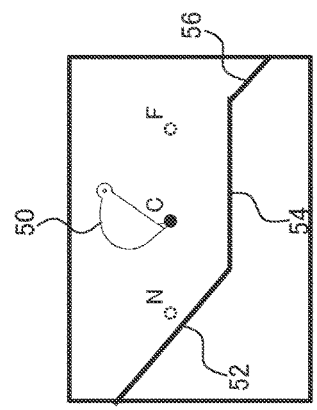
FIG. 11C illustrates an example of the display screen of the display system for a construction machine of the first embodiment of the invention.

FIGS. 11A, 11B, and 11C illustrate examples in which the above computation results are displayed on the display screen. FIG. 11A is an example of the display screen when it is determined that the bucket will move in the −X direction (when S230 of FIG. 10 is executed), FIG. 11B being an example of the display screen when it is determined that the bucket will move in the +X direction (when S210 of FIG. 10 is executed), FIG. 11C being an example of the display screen when it is not certain which direction, the +X direction or the −X direction, the bucket will move in (when S240 of FIG. 10 is executed). It should be noted that although FIGS. 11A to 11C illustrate points N, C, and F for the purpose of clarifying the relation between FIG. 9 and FIGS. 11A to 11C, it is preferred that points N, C, and F not be displayed on the actual screen.

According to the above-described display system for a construction machine of the present embodiment, when it is determined that the predictive moving direction of the bucket 1c is in the −X direction, the bucket claw tip of a bucket image 50 is displayed at point N as in FIG. 11A, and the region located in the −X direction (predictive moving direction) from the bucket image 50 is displayed widely on the display screen, thereby allowing the operator to easily grasp the shape of a target surface 56 located in the moving direction (−X direction) of the bucket 1c. Likewise, when it is determined that the predictive moving direction of the bucket 1c is in the +X direction, the bucket claw tip of the bucket image 50 is displayed at point F as in FIG. 11B, and the region located in the +X direction (predictive moving direction) from the bucket image is displayed widely on the display screen, thereby allowing the operator to easily grasp the shape of a target surface 52 located in the moving direction (+X direction) of the bucket 1c. Also, when the predictive moving direction of the bucket 1c cannot be identified, the bucket claw tip of the bucket image 50 is displayed at point C as in FIG. 11C. Since the region located in the +X direction from the bucket image and the region located in the −X direction from the bucket image become substantially equal in area, the operator can easily grasp the shapes of the target surfaces 52 and 56 located in the +X direction and the −X direction, respectively, whichever direction the bucket 1c is moved in.

Further, although the space of the display screen of the monitor 12 is limited to display images of the bucket and target surfaces, changing the display position of the bucket image based on the predictive moving direction of the bucket 1c as in the present embodiment allows changing the space in which a target surface is displayed based on the predictive moving direction, whereby the operator can easily grasp the shape of the target surface located in the moving direction of the work tool while keeping the size of the display screen unchanged.

A target surface located in an upper vertical direction or lower vertical direction from the bucket claw tip (that is, a target surface located right above or right below the bucket claw tip) cannot be displayed on the display screen if the distance from the target surface from the bucket claw tip is too large. In that case, it is preferred that the display system further include a target-surface directional guide section 111f (see FIG. 7) that displays on the display screen the direction in which the target surface exists using letters, figures, or symbols (for example, arrows) or provides an audio guide indicative of the direction in which the target surface exists.

The display position of the bucket 1c and the positional information of a target surface are input to the target-surface directional guide section 111f of the present embodiment by the target-surface display control section 111d and the machine-body to target-surface positional relation computing/storage section 110b, respectively. Based on the input information, the target-surface directional guide section 111f determines whether or not the target surface located right below or right above the bucket claw tip can be displayed within the display screen. If it is determined that the target surface cannot be displayed (that is, if the target surface exists outside the display screen), the direction in which the target surface exists is displayed on the screen with the use of an arrow (arrow 60).

Figure 12A:
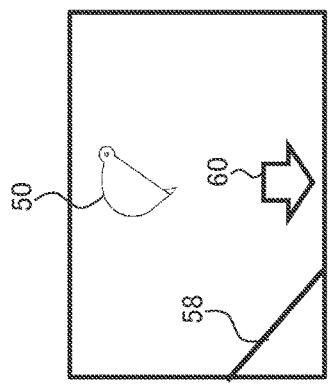
FIG. 12A illustrates an example of the display screen of the display system for a construction machine of the first embodiment of the invention.
Figure 12B:
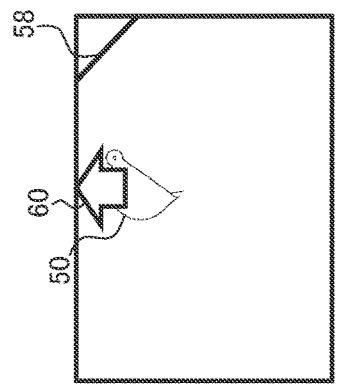
FIG. 12B illustrates an example of the display screen of the display system for a construction machine of the first embodiment of the invention.

FIGS. 12A and 12B illustrate examples of the display screen on which the direction in which a target surface located outside the display screen exists is indicated by an image of an arrow 60. FIG. 12A is an example of the display screen with an image of the arrow 60 pointing the lower end of the display screen because a target surface located right below the bucket claw tip exists outside the target screen. FIG. 12B is an example of the display screen with the image of the arrow 60 pointing the upper end of the display screen because a target surface located right above the bucket claw tip exists outside the target screen. Specific examples of cases where a target surface is located above the bucket 1c as in FIG. 12B are cases where embankment work is performed and where too much excavation is performed on the target surface.

Although part of a target surface is displayed in the examples of FIGS. 12A and 12B, there is a case where only the bucket image 50 appears on the display screen with no target surface being displayed if the scale of the display screen is kept at a predetermined value. In such cases where the operator has difficulty in grasping or cannot grasp at all the position of a target surface, by using the above-described display system for a construction machine having the target-surface directional guide section 111f, the operator can easily grasp which direction the target surface located outside the display screen exists in even if the target surface is not displayed on the display screen. This way, the operator does not need to perform unnecessary operations to grasp the shape of the target surface, whereby work efficiency is prevented from decreasing.

In the above examples, the arrows 60 displayed on the screen have a fixed length, but the length of the arrows 60 can be changed based on the distance from the bucket claw tip to the target surface.

Also, FIGS. 12A and 12B illustrates cases where the bucket claw tip of the bucket image 50 is located at point C (not illustrated), but the same explanation applies to cases where the bucket claw tip is located at point F or N.

Further, in the above examples, while the direction in which a target surface located right below or right above the bucket claw tip exists is displayed on the display screen, it is also possible to display on the display screen the direction in which the target surface located closest to the bucket claw tip exists or display on the display screen the direction in which a target surface satisfying other conditions exists. In other words, it is only necessary to display on the display screen the direction in which a target surface satisfying particular conditions exists.

In S110 and S120 of FIG. 8, the predictive moving direction is defined by the X component alone for the purpose of simplifying explanation and processing, but it is also possible to obtain a predictive moving direction by considering the Z component as well in S110 or S120. In that case, the position of the claw tip of the bucket image can be determined by the following method, for example. First, the inverse vector of the vector of the predictive moving direction computed in S110 or S120 is generated in the X-Z coordinate system, and it is converted into a vector in the U-W coordinate system by multiplying it by a predetermined scale factor. The starting point of the inverse vector after the conversion moves in the U-W coordinate system such that it matches the reference position C (MLU/2, MLW/2), and the point distanced by a predetermined distance R from the reference position C on the inverse vector V1r after the movement or an extended line of that vector is set as point P at which the bucket claw tip of the bucket image is displayed (see FIG. 13). In other words, the position distanced by the predetermined distance R from the reference position C in the direction opposite the predictive moving direction computed by the moving direction computing section 111b is set as the display position P of the bucket image on the display screen. By setting the display position of the bucket image as above, the bucket image is displayed in the direction opposite the predictive moving direction, thereby securing space in the predictive moving direction. Therefore, a target surface located in the space can be displayed on the display screen.

Figure 13:
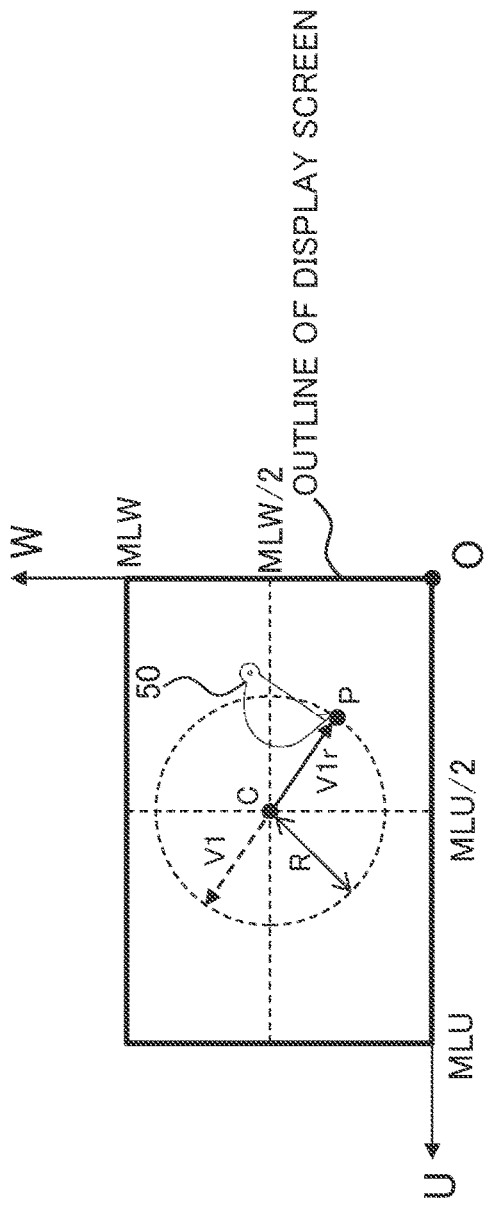
FIG. 13 illustrates another method for determining the claw tip position of a bucket image on the display screen of the monitor of the first embodiment of the invention.

Although the reference position C is set at the center of the display screen in FIG. 13, it can also be set at other positions. The vector V1 of FIG. 13 is obtained by converting the vector of the predictive moving direction generated in the X-Z coordinate system into a vector in the U-W coordinate system.

Although the display position of the bucket claw tip of the bucket image is changed based only on the predictive moving direction in the above, it is also possible to estimate a predictive moving speed in addition to the predictive moving direction and change the display position of the bucket claw tip of the bucket image based on the predictive moving direction and the predictive moving speed. The predictive moving speed is used to determine the value of the predetermined distance R (see FIG. 13), and the predictive moving speed and the distance R need to be correlated with each other such that, for example, a proportional relation is established between the two. By this setting, the bucket image is located at the periphery of the display screen if the predictive moving speed is too large, and the bucket image is located near the center of the display screen if the predictive moving speed is small. In other words, it is possible to increase the size of the space to be secured according to the predictive moving speed.

Although the predictive moving direction of the bucket 1c is computed based on operation signals from the operation levers 4a to 4c and the posture of the work device 1A in S110 of FIG. 8, it is also possible to compute the predictive moving direction of the bucket 1c based only on the operation signals form the operation levers 4a to 4c. If this method is to be adopted, operating the operation levers 4a to 4c will allows operation signals to be output even if, for example, at least one of the hydraulic cylinders 3a to 3c is fully expanded or contracted and the bucket 1c cannot be moved. Thus, it is possible to correlate the display position of the bucket image on the display screen with the operation of the operation levers 4a to 4c and at the same time separate the display position of the bucket image from the moving direction of the bucket 1c. With this, even if the actual bucket claw tip is located on Rmax (see FIG. 6) and the bucket 1c cannot be moved to a position located away from Rmax, it is possible to display a target surface located farther away from Rmax on the display screen by, for example, performing an arm dumping operation to allow the synthesis display unit 111 to recognize that the predictive moving direction lies ahead. As a result, the operator can grasp the shape of the target surface.

In the above, as an example of the method of computing the predictive moving direction based only on the posture of the work device 1A in S120, the predictive moving direction is correlated in advance with the three closed regions S1, S2, and S3, which are regions equally divided in an X direction, and the predictive moving direction is estimated based on which region the bucket claw tip is located in. However, it is also possible to define multiple closed regions not only in an X direction but also in a Z direction and estimate the predictive moving direction based on which closed region the bucket claw tip is located in. The division number in the X or Z direction is not limited to 3, and any number can be used.

While the three operation levers 4a to 4c for controlling the work device 1A are used to compute the predictive moving direction of the bucket 1c, it is also possible to compute the predictive moving direction further using controls signals from the operation levers 4d, 4e, and 4f, which control the swing structure 1d and the travel structure 1e, because the bucket 1c is also moved by moving the swing structure 1d or the travel structure 1e.

In the above explanation, the angle sensors 8a, 8b, and 8c are used to detect status parameters related to the position and posture of the work device 1A. However, it is also possible to use tilt angle sensors for detecting the tilt angles of the boom 1a, the arm 1b, and the bucket 1c or sensors for detecting the amounts of expansion and contraction of the boom cylinder 3a, the arm cylinder 3b, and the bucket cylinder 3c.

In the above explanation, the scale of the bucket side-view image is fixed. However, the control may be performed such that the scale is changed based, for example, on the distance between the closest target surface and the bucket claw tip, thereby allowing the closest target surface and the bucket to appear on the display screen.

It is also possible to display on the display screen text information such as information on the distance from the bucket claw tip to a target surface and information on bucket angles, together with the images of the bucket 1c and the target surface.

It is further possible to allow the above construction machine to employ the area limiting technique to automatically control the movement of the work device based on the positional information of a target surface and the positional information of the bucket claw tip, so that excavation can be performed only (so that the bucket claw tip can be located) on and above the target surface.

In the above explanation, we have described examples in which the operation levers 4a to 4c are electric levers that output electric signals as operation signals. However, it is also possible to use hydraulic pilot operation levers that output hydraulic signals as operation signals. In that case, the hydraulic pressures of the operation signals are detected by pressure sensors, and the detected pressures can be used to measure the operation amounts of the levers.

In the above explanation, we have described an example in which a bucket image as viewed from the left side of the hydraulic excavator is displayed on the display screen of the monitor 12. However, it is also possible to display on the monitor 12 a bucket image as viewed from the right side of the hydraulic excavator. It is further possible to allow the operator to switch between the two.

Figure 14:
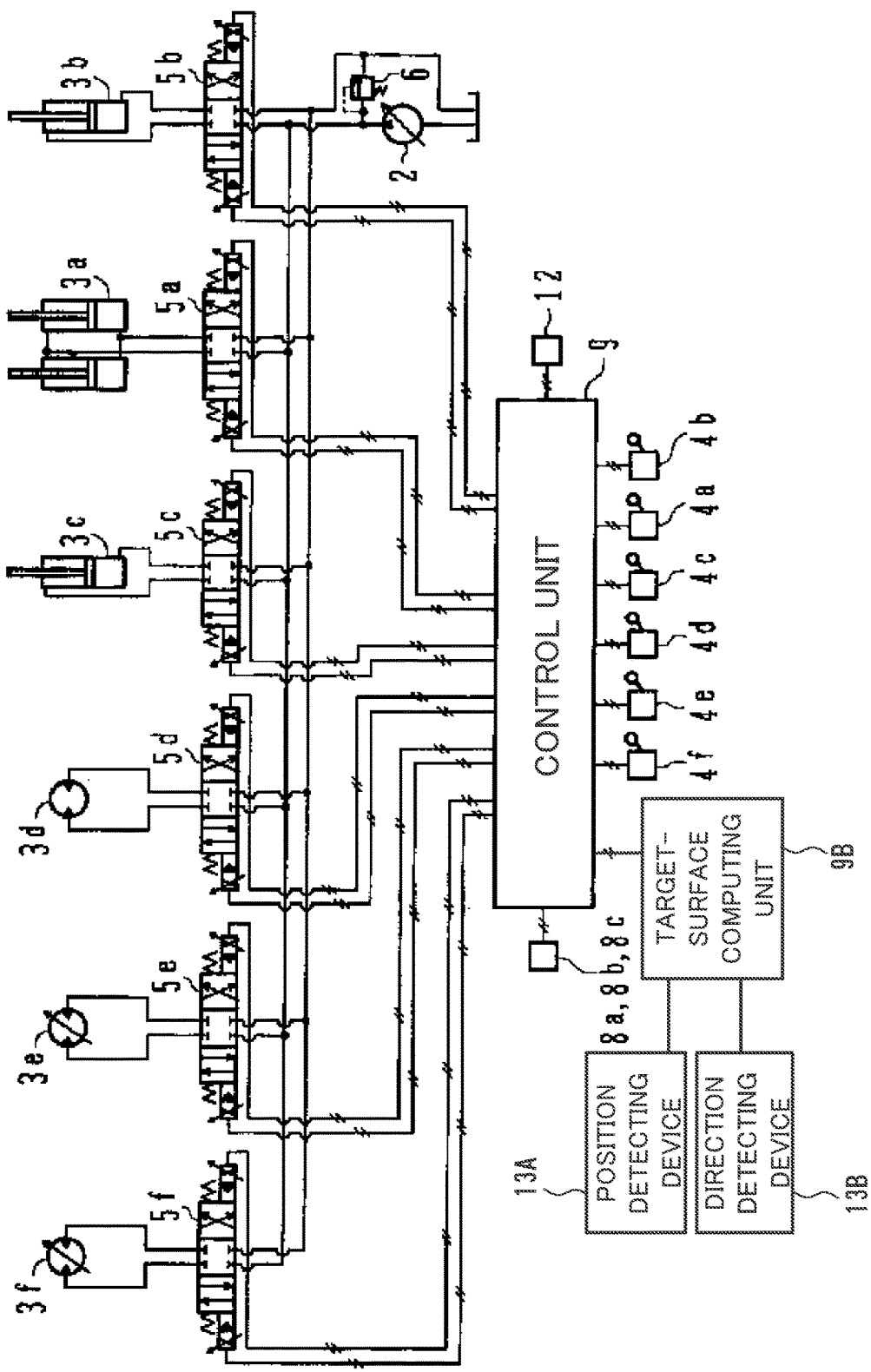
FIG. 14 is a circuit diagram of a hydraulic excavator according to a second embodiment of the invention.

In the above, a target surface is set based on the coordinates of the bucket claw tip at two or more points, which are stored by operating the setting device 7. However, it is also possible to provide a different input device and set a target surface based on any values input through the input device and indicative of the position or gradient of the target surface. It is further possible to store target surfaces on, for example, a storage device of the control unit 9 or a storage device provided outside the control unit 9 (for example, a storage device provided outside of the hydraulic excavator) and set a target surface by reading it from such a storage device. Referring now to FIGS. 14 and 15, we describe another embodiment in which a target surface existing in the predictive moving direction of the bucket 1c is displayed on the screen by using target surfaces stored on a storage device provided outside of the control unit 9. The same components as those used in the previous drawings are assigned the same reference characters and will not be explained further in detail.

FIG. 14 is a schematic diagram illustrating the configuration of a hydraulic excavator to which a display system for a construction machine according to a second embodiment of the present invention is applied. The external appearance and coordinate system of the hydraulic excavator of the present embodiment are the same as in the first embodiment.

The hydraulic excavator of FIG. 14 includes a position detecting device (for example, GPS receiver) 13A for detecting the global position of the hydraulic excavator or the bucket 1c; a direction detecting device (for example, GPS receiver or gyrosensor) 13B for detecting the global direction of the hydraulic excavator or the bucket 1c; and a target-surface computing unit 9B for extracting a target surface to be displayed on the display screen of the monitor 12.

The target-surface computing unit 9B is a computer (for example, microcomputer) and has the same hardware configuration as the control unit 9. The target-surface computing unit 9B and the control unit 9 each have an interface that allows mutual communication.

FIG. 15 is a functional block diagram illustrating the control programs stored on a storage device (ROM 93) of the control unit 9 and a storage device of the target-surface computing unit 9B.

The control unit 9 includes a display range command section 16 in addition to the display processing section 11 and the excavation control section 10. The display processing section 11 performs all the processing performed by the setting/display processing section 11 of the first embodiment except setting processing of a target surface. This is because, in the present embodiment, target surface data is input from the target-surface computing unit 9B.

The target-surface computing unit 9B includes a target-surface storing section 17 on which to store the three-dimensional data of target surfaces and a data extracting section 18 for extracting, from the three-dimensional target-surface data stored on the target-surface storing section 17, the data of target surfaces included in a predetermined range around the current position of the bucket 1c as a reference position.

The data extracting section 18 of the present embodiment includes a two-dimensional target-surface generating section 14 and a partial two-dimensional target-surface generating section 15.

The two-dimensional target-surface generating section 14 defines a plane passing the center of the work device 1A including the bucket 1c (corresponding to the X-Z plane of FIG. 6) based on the direction of the bucket 1c and extracts as the data of a target surface (two-dimensional target-surface data) a two-dimensional drawing obtained by cutting three-dimensional data with the plane. Usually, the two-dimensional drawing extracted is a polyline.

The partial two-dimensional target-surface generating section 15 extracts, from the two-dimensional target-surface data extracted by the two-dimensional target-surface generating section 14, the data included in the predetermined range around the position of the bucket 1c as a reference and outputs this data to the display processing section 11 of the control unit 9 as partial two-dimensional target-surface data. The data extraction by the partial two-dimensional target-surface generating section 15 includes a method in which only the data located within a predetermined distance range in the front and back directions (+X direction and −X direction) of the machine body from the position of the bucket 1c as a reference is regarded as the target-surface data and a method in which the position of the claw tip (monitored position) of the bucket 1c on the display screen is input from the display range command section 16 and only the data located within a predetermined distance range in the front and back directions of the machine body from the monitored position as a reference is regarded as the target-surface data.

The display range command section 16 outputs to the partial two-dimensional target-surface generating section 15 the range of the two-dimensional target-surface data from which to extract partial two-dimensional target-surface data, based on the monitored position of the bucket claw tip (display position of the bucket image) input from the display position correcting section 111c. The extraction range can be defined by the distance in the +X direction or −X direction from the position of the bucket claw tip as a reference. Because the two-dimensional target-surface data is usually defined by a polyline connecting multiple points (points T1, T2, T3, an T4 in FIG. 6), the extraction range can also be defined by the number of points in the +X direction or −X direction from the position of the bucket claw tip as a reference. In either case, it is preferred that the distance or the number of points in the front and back direction of the machine body used for the extraction of target-surface data be changed based on changes in the monitored position because the monitored position of the bucket claw tip changes in response to the predictive moving direction of the bucket. If the extraction range of the partial two-dimensional target-surface data is determined not based on the monitored position of the bucket claw tip (U-W coordinate system) but on the position of the bucket claw tip in the global coordinate system, the display range command section 16 can be omitted because the range of extraction can be determined by the partial two-dimensional target-surface generating section 15 alone.

The target-surface display control section 111*d* in the display processing section 11 displays an image of a target surface based on the partial two-dimensional target-surface data input from the partial two-dimensional target-surface generating section 15.

According to the display system for a construction machine of the present embodiment described above, when target surfaces are transmitted between the target-surface computing unit 9B and the control unit 9, only the data of target surfaces in the display range of the monitor 12 or a range similar to it is transmitted. Thus, the amount of data transmitted or received is prevented from increasing, which in turn prevents processing lag associated with data transmission.

In the above explanation, although the control unit 9 and the target-surface computing unit 9B are constructed by separate computers, the two can also be constructed by using one computer. Alternatively, it is possible to distribute the functions of the control unit 9 and the target-surface computing unit 9B among three or more computers. In this case as well, the amount of data transmitted or received among multiple computes or within a single computer is prevented from increasing, thereby preventing processing lag.

In the above explanation, two-dimensional target-surface data and partial two-dimensional target-surface data are extracted from the three-dimensional data of a target surface. However, it is also possible to extract partial two-dimensional target-surface data from two-dimensional target-surface data.

The present invention is not limited to the embodiments described above but allows various modifications without departing from the scope of the invention. For instance, the system of the invention does not necessarily need to have all the components of each of the embodiments, and some of the components can be removed. Further, some components of an embodiment can be added to another embodiment or replaced by some components of another embodiment.

The above-described computers (the control unit 9 and the target-surface computing unit 9B) can be formed partially or completely by hardware (for example, an integrated circuit can be used to implement the logic that executes each function) in terms of components, functions, or processing. Some components of the above computers can also be programs (software) a computational processing device (for example, CPU) reads and executes that implement the functions of the above computers. The information on the programs can be stored on, for example, a semiconductor memory (flash memory, SSD, or the like), a magnetic storage device (hard disk drive or the like), or a recording medium (magnetic disk, optical disk, or the like).

In the explanation of the above embodiments, as control lines and information lines, we have only shown those that seem relevant to the explanation and have not necessarily shown all the control lines and information lines that a product needs to have. Thus, it can be assumed that almost all the components are in fact interconnected.

DESCRIPTION OF REFERENCE CHARACTERS

1A: Work device
1*c*: Bucket (work tool)
8*a*, 8*b*, 8*c*: Angle sensor
12: Monitor
14: Two-dimensional target-surface generating section
15: Partial two-dimensional target-surface generating section
110*a*: Bucket position/posture computing section (position/posture computing section)
111*a*: Normal display determining section
111*b*: Moving direction computing section
111*c*: Display position correcting section
111*d*: Target-surface display control section
111*e*: Work-tool display control section
111*f*: Target-surface directional guide section
17: Target-surface storing section
18: Data extracting section
50: Bucket image (image of work tool)
52, 54, 56: Image of target surface

The invention claimed is:

1. A construction machine comprising:
a work device for excavating a predetermined target surface with a work tool;
an operation lever for operating the work device;
a display monitor; and
a control unit configured to control the display monitor to display a display screen including an image of the work tool and an image of the target surface which indicate a positional relationship between the work tool and the target surface,
wherein the control unit includes a storage device which stores data including a position of the target surface in a first coordinate system,
wherein the control unit is further configured to:
compute a position and a posture of the work tool in the first coordinate based on status parameters related to a position and a posture of the work device;
display, on the display screen, the image of the work tool at a reference position set in a second coordinate system set on the display screen based on the position and the posture of the work device in the first coordinate system,
display, on the display screen, the image of the target surface included in the display screen upon displaying the image of the work tool at the reference position in accordance with the position and the posture of the work device in the first coordinate system and the position of the target surface in the first coordinate system,
compute a predictive moving direction of the work tool based at least on the position and the posture of the work device in the first coordinate system or on an operation amount of the operation lever;
when a movement of the work implement is predicted based at least on the position and the posture of the work device in the first coordinate system or on the operation amount of the operation lever, change a display position of the image of the work tool from the reference position to another position, and display, on the display screen, the image of the target surface included in the display screen upon displaying the image of the work tool at the other position in accordance with the position and the posture of the work device in the first coordinate system and the position of the target surface in the first coordinate system, and
wherein the other position is set in the second coordinate system, and an area of a region located on a predictive moving direction side from the image of the work tool when displaying the image of the work tool on the display screen at the other position is wider than when displaying the image of the work tool on the display screen at the reference position.

2. The construction machine of claim 1,
wherein the control unit is further configured to display the image of the work tool such that a machine body of the construction machine is positioned in one of left and right directions of the display screen, and
wherein the control unit is further configured to:
when the predictive moving direction is away from the machine body of the construction machine, display the image of the work tool at the other position which is located closer to the machine body of the construction machine than the reference position,
when the predictive moving direction is closer toward the machine body, display the image of the work tool at the other position which is located farther away from the machine body than the reference position, and
when a movement of the work tool is unpredictable, display the image of the work tool at the reference position on the display screen.

3. The construction machine of claim 1,
wherein the other position is separated by a predetermined distance from the reference position in a direction opposite the predictive moving direction.

4. The construction machine of claim 1, wherein the control unit is further configured to display, on the display screen, a direction in which the target surface exists when the image of the target surface is not displayed on the display screen.

5. The construction machine of claim 1, wherein the control unit is further configured to:
extract, from the data of the target surface stored on the storage device, data included in a predetermined range around the position of the work tool as a reference, and
display the image of the target surface on the display screen based on the extracted data.

* * * * *